(12) United States Patent
Okumiya et al.

(10) Patent No.: US 10,455,874 B2
(45) Date of Patent: Oct. 29, 2019

(54) DATA GLOVE

(71) Applicant: Yamaha Corporation, Hamamatsu-shi, Shizuoka (JP)

(72) Inventors: Yasuro Okumiya, Hamamatsu (JP); Koji Yataka, Shuchi-gun (JP); Katsunori Suzuki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 279 days.

(21) Appl. No.: 15/487,669

(22) Filed: Apr. 14, 2017

(65) Prior Publication Data

US 2017/0215495 A1 Aug. 3, 2017

Related U.S. Application Data

(63) Continuation of application No. PCT/JP2015/078414, filed on Oct. 6, 2015.

(30) Foreign Application Priority Data

| Oct. 17, 2014 | (JP) | 2014-212352 |
| Jan. 6, 2015 | (JP) | 2015-000738 |
| Jan. 6, 2015 | (JP) | 2015-000739 |

(51) Int. Cl.
*G01B 7/00* (2006.01)
*A41D 19/00* (2006.01)
(Continued)

(52) U.S. Cl.
CPC ..... *A41D 19/0027* (2013.01); *A41D 19/0013* (2013.01); *G01B 7/16* (2013.01);
(Continued)

(58) Field of Classification Search
CPC ............ A41D 19/0027; A41D 19/0013; G01B 5/207; G01B 7/16; G01B 7/18; G01B 7/287; G06F 3/014
(Continued)

(56) References Cited

U.S. PATENT DOCUMENTS

| 5,212,372 A | 5/1993 | Quick et al. |
| 5,280,265 A | 1/1994 | Kramer et al. |

(Continued)

FOREIGN PATENT DOCUMENTS

| CN | 2358435 Y | 1/2000 |
| JP | 4-233443 A | 8/1992 |

(Continued)

OTHER PUBLICATIONS

Partial Supplementary European Search Report issued in counterpart European Application No. 15850771.5 dated Mar. 19, 2018 (eleven (11) pages).

(Continued)

*Primary Examiner* — Max H Noori
(74) *Attorney, Agent, or Firm* — Crowell & Moring LLP

(57) ABSTRACT

Provided is a data glove which imparts little discomfort when worn, and is capable of accurately detecting movement of a hand. The data glove includes a glove main body and a plurality of strain sensors which are disposed on the dorsal side of the glove main body in regions corresponding to at least one finger, and which detect stretch and contraction of the glove main body. The strain sensors preferably include two strain sensors which are disposed on the dorsal side of the glove main body to correspond respectively to a proximal interphalangeal joint and a metacarpophalangeal joint of at least one finger of the second through fifth fingers, and which detect stretch and contraction of the glove main body in a proximal-distal direction. The data glove prefer- (Continued)

ably further includes a plurality of stretch prevention parts which limit the elongation of the glove main body.

9 Claims, 8 Drawing Sheets

(51) Int. Cl.
*G01B 7/16* (2006.01)
*G06F 3/01* (2006.01)
*G01B 7/287* (2006.01)

(52) U.S. Cl.
CPC .............. *G01B 7/18* (2013.01); *G01B 7/287* (2013.01); *G06F 3/014* (2013.01)

(58) Field of Classification Search
USPC .......................................................... 73/855
See application file for complete search history.

(56) References Cited

U.S. PATENT DOCUMENTS

| | | | |
|---|---|---|---|
| 5,316,017 A * | 5/1994 | Edwards | G06F 3/014 600/595 |
| 5,930,741 A | 7/1999 | Kramer | |
| 6,452,584 B1 | 9/2002 | Walker et al. | |
| 8,704,758 B1 | 4/2014 | Figley et al. | |
| 2004/0034505 A1 | 2/2004 | Kimble | |
| 2014/0238153 A1 | 8/2014 | Wood et al. | |
| 2018/0372562 A1* | 12/2018 | Keller | G01L 1/142 |

FOREIGN PATENT DOCUMENTS

| | | |
|---|---|---|
| JP | 10-286338 A | 10/1998 |
| JP | 2000-329511 A | 11/2000 |
| JP | 2011-47702 A | 3/2011 |
| WO | WO 98/07368 A1 | 2/1998 |
| WO | WO 2005/067796 A1 | 7/2005 |
| WO | WO 2011/024539 A1 | 3/2011 |
| WO | WO 2013/149181 A1 | 10/2013 |

OTHER PUBLICATIONS

Extended European Search Report issued in counterpart European Application No. 15850771.5 dated May 25, 2018 (thirteen (13) pages).
European Office Action issued in counterpart European Application No. 15850771.5 dated Dec. 19, 2018 (six (6) pages).
Japanese-language Office Action issued in counterpart Japanese Application No. 2015-000738 dated Feb. 5, 2019 with English translation (five (5) pages).
Japanese-language Office Action issued in counterpart Japanese Application No. 2015-000739 dated Feb. 5, 2019 with English translation (four (4) pages).
International Search Report (PCT/ISA/210) issued in PCT Application No. PCT/JP2015/078414 dated Dec. 28, 2015 with English translation (five pages).
Japanese-language Written Opinion (PCT/ISA/237) issued in PCT Application No. PCT/JP2015/078414 dated Dec. 28, 2015 (four pages).
English translation of Chinese-language Office Action issued in counterpart Chinese Application No. 201580056298.0 dated Jun. 25, 2019 (14 pages).
Japanese-language Office Action issued in counterpart Japanese Application No. 2015-000739 dated Aug. 20, 2019 with English translation (five (5) pages).

* cited by examiner

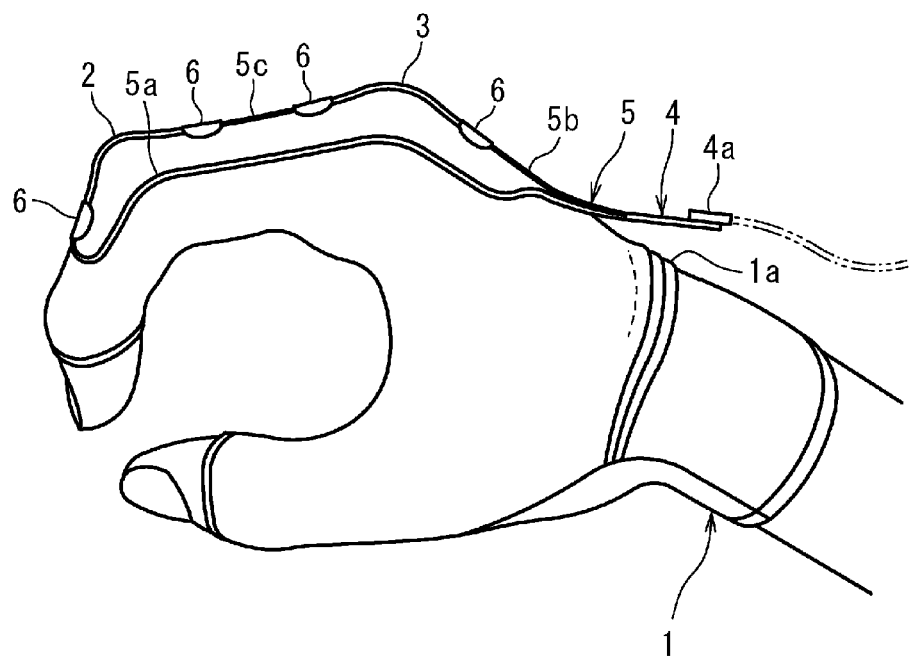
F I G. 2

DATA GLOVE

TECHNICAL FIELD

The present invention relates to a data glove.

BACKGROUND ART

A data glove is commercially available, which is provided with a plurality of sensors for detecting movement of fingers of the human hand. Such a commercially available data glove is generally provided with bend sensors in regions corresponding to the respective phalangeal joints, and detects the joint angles in real time.

Such a data glove is being envisaged to be used for reproducing hand motions in virtual reality technologies applied in games, etc. as well as scientifically analyzing hand motions in sports such as a golf swing, or in playing a musical instrument such as a piano.

In particular, when the hand motion of professional athletes or musicians is analyzed, a subtle difference in movement could bear great importance. However, with a conventional data glove with a large number of sensors, a wearer may be unable to reproduce the usual movement due to discomfort when worn, leading to a failure to obtain effective data.

Further, there has been proposed a data glove for detecting bending and extension of the fingers by virtue of a sensor being provided for detecting stretch and contraction of the cloth (for example, refer to Japanese Unexamined Patent Application, Publication No. 2000-329511). However, the data glove disclosed in Japanese Unexamined Patent Application, Publication No. 2000-329511 detects movement of one finger by way of one sensor, and therefore cannot accurately detect movement of the finger having a plurality of joints. In addition, such a data glove is likely to cause misalignment of the sensor, and is difficult to accurately detect the hand motion. Moreover, some of the phalangeal joints, such as the metacarpophalangeal joints of the second to fourth fingers, are capable of bending and extending in the dorsal-palmar direction, as well as swinging in the lateral direction. Therefore, the data glove disclosed in Japanese Unexamined Patent Application, Publication No. 2000-329511 cannot accurately detect the hand motion.

PRIOR ART DOCUMENTS

Patent Documents

Patent Document 1: Japanese Unexamined Patent Application, Publication No. 2000-329511

SUMMARY OF THE INVENTION

Problems to be Solved by the Invention

In order to address the foregoing inconvenience, it is an object of the present invention to provide a data glove which is less likely to cause discomfort when worn and is able to detect the hand motion relatively accurately.

Means for Solving the Problems

According to an aspect of the present invention that has been made to solve the problems, a data glove includes: a glove body; and a plurality of strain sensors which detect stretch and contraction of the glove body, and which are each provided in a region corresponding to at least one finger of first to fifth fingers, on a dorsal side of the glove body, in which at least two of the strain sensors are provided to each of the at least one finger. It is to be noted that, in relation to the glove body, the term "dorsal side" as referred to herein means a side that covers the back of the hand; and the term "palm side" as referred to means another side, i.e., a side of the palm of the hand.

The data glove includes a plurality of strain sensors in a region corresponding to at least one finger of first to fifth fingers, on a dorsal side of the glove body, and the strain sensors detect stretch and contraction of the glove body, in which at least two of the strain sensors are provided to each of the at least one finger, thereby enabling the plurality of strain sensors to detect movement of the same finger. Therefore, the data glove is able to detect movement of the finger relatively accurately. Furthermore, the strain sensors for detecting stretch of the glove body are thin and capable of adhering to the hand to reduce a reaction force, and are therefore less likely to cause discomfort for the wearer. Therefore, the wearer of the data glove is able to perform delicate actions in playing sports, playing musical instruments, and the like as usual, whereby conversion of natural movement of the hand into data is enabled.

The plurality of strain sensors preferably include a first strain sensor and a second strain sensor, which detect stretch and contraction of the glove body in a proximal-distal direction, and which are provided in a region corresponding to a proximal interphalangeal joint and a region corresponding to a metacarpophalangeal joint, of at least one finger of the second to fifth fingers, on the dorsal side of the glove body. In this manner, stretch of regions corresponding to proximal interphalangeal joints (PIP joints: the second phalangeal joints) and metacarpophalangeal joints (MP joints: the third phalangeal joints, i.e., knuckles) of at least one of the second to fifth fingers on the dorsal side of the glove body is enabled to be measured, whereby relatively accurate detection of movement of the fingers is possible. In particular, since the metacarpophalangeal joints are where the second to fifth fingers branch off from the palm, the glove is likely to adhere to the hand in these regions. As a result, the strain sensors are less likely to be misaligned, enabling relatively accurate detection of movement of the metacarpophalangeal joints.

A plurality of stretch-restraining portions for restraining stretch of the glove body are preferably provided along the proximal-distal direction, in a region corresponding to an area between the metacarpophalangeal joints on the dorsal side of the glove body. The stretch-restraining portions for restraining stretch of the glove body are thus provided between the metacarpophalangeal joints of the glove body and are thereby positioned at the valley-like portions formed between the metacarpophalangeal joints, where the skin is relatively less stretched when the metacarpophalangeal joints are bent. As a result, the strain sensors are enabled to be arranged more infallibly on the metacarpophalangeal joints, whereby more accurate detection of the bending and extension of the metacarpophalangeal joints is possible.

The proximal ends of the stretch-restraining portions are preferably located more proximally than the strain sensors, and a connection portion for restraining stretch of the glove body is preferably provided so as to bridge the plurality of stretch-restraining portions. Due to the stretch-restraining portions being mutually connected by way of the connection portion for restraining stretch of the glove body, the connection portion being located more proximally than the strain sensors, influence of the bending and extension of the wrist on the strain sensors arranged on the metacarpophalangeal joints can be reduced.

The stretch-restraining portion is preferably provided to be superposed on the wiring extending from the strain sensor. Due to the stretch-restraining portion being provided to be superposed on the wiring extending from the strain sensor, the wiring is easily provided, disconnection can be prevented, and the wiring is less likely to inhibit the strain sensor from stretching and contracting.

The plurality of strain sensors are preferably configured to include a third strain sensor and a fourth strain sensor provided in each region corresponding to the metacarpophalangeal joint of at least one finger of the first to fifth fingers, on the dorsal side of the glove body, the third strain sensor being configured to detect stretch and contraction of the region in the proximal-distal direction and the fourth strain sensor being configured to detect stretch and contraction of the region in the lateral direction. Due to measuring stretch of the glove body in two directions on the dorsal side of the metacarpophalangeal joint of at least one finger of the first to fifth fingers, the bending and extension of the finger as well as the swinging of the finger in the lateral direction can be detected. Therefore, the data glove is enabled to detect three-dimensional movement of the fingers relatively accurately.

The third strain sensor and the fourth strain sensor are preferably provided so as to intersect each other. Due to the strain sensors being provided so as to intersect each other, stretch and contraction of substantially the same region of the glove body in two different directions can be detected, whereby more accurate detection of movement of the fingers is enabled.

The intersection angle formed by the third strain sensor and the fourth strain sensor is preferably a substantially right angle. Due to the intersection angle formed by the two sensors being a substantially right angle, the bending and extension in the dorsal-palmar direction as well as the swinging in the lateral direction can be detected with relatively high accuracy. It is to be noted that the term "substantially right angle" as referred to herein means that the angle formed by the sensors is no less than 60°, and preferably no less than 80°.

The third strain sensor and the fourth strain sensor are preferably provided to the first finger (thumb), which is frequently moved in the lateral direction. Due to detecting the bending and extension of the first finger in the dorsal-palmar direction as well as the swinging of the first finger in the lateral direction, more accurate capture of the hand motion is enabled.

A fifth strain sensor for detecting stretch and contraction of the glove body in the proximal-distal direction is preferably further provided in a region along the proximal phalanx of the second or fifth finger, on the palm side of the glove body. Due to the fifth strain sensor for detecting stretch and contraction of the glove body in the proximal-distal direction being provided in the region along the proximal phalanx on the palm side of the second or fifth finger, extension of the finger toward the dorsal side can be detected. As a result, more extensive detection of the hand motion is enabled.

Effects of the Invention

As described above, the data glove according to the aspects of the present invention is less likely to cause discomfort when worn, and is able to relatively accurately detect the hand motion.

BRIEF DESCRIPTION OF THE DRAWINGS

FIG. 2 is a schematic perspective view illustrating a state of the data glove illustrated in FIG. 1 being worn;

DESCRIPTION OF EMBODIMENTS

Hereinafter, embodiments of the present invention will be described with reference to the drawings as necessary.

First Embodiment

Figure 1:
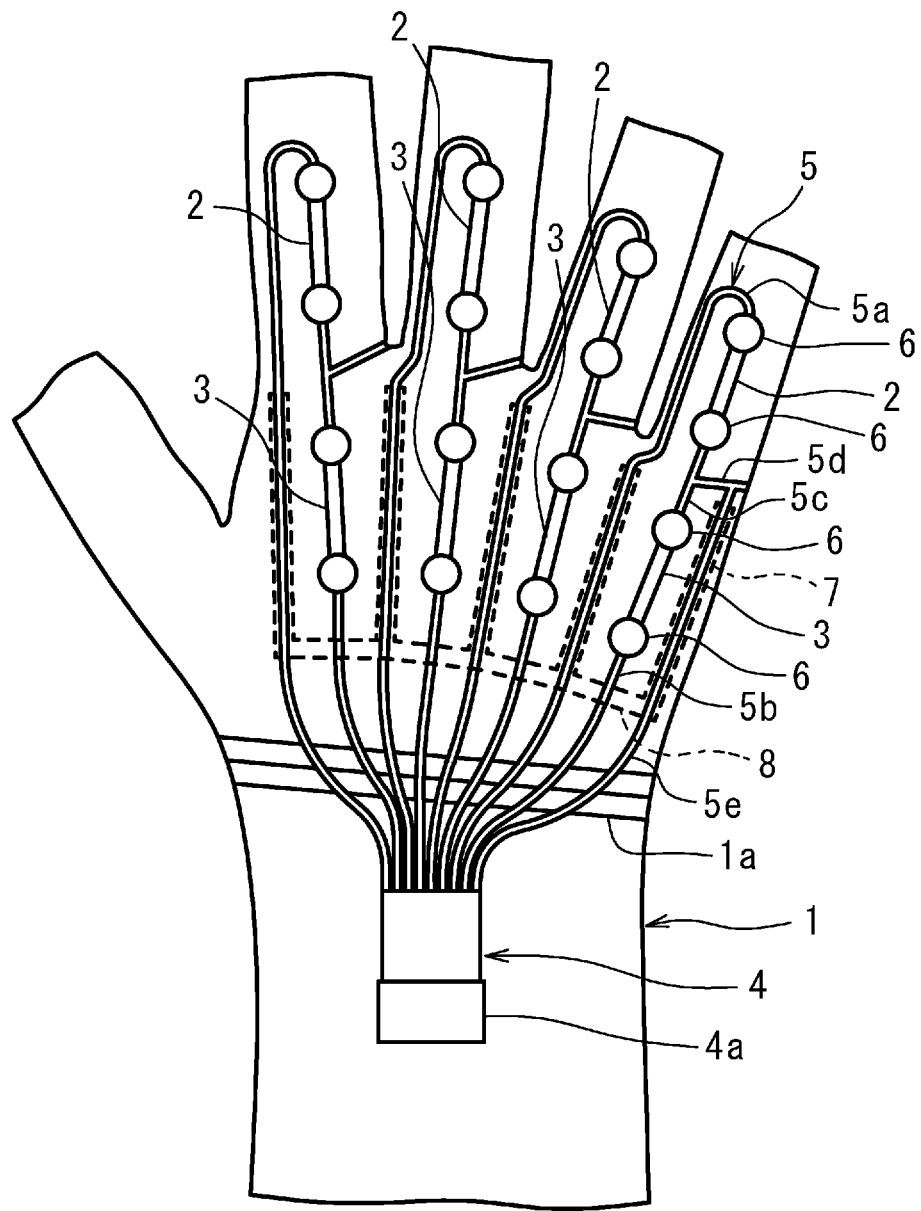
FIG. 1 is a schematic plan view illustrating a data glove according to an embodiment of the present invention.
Figure 3:
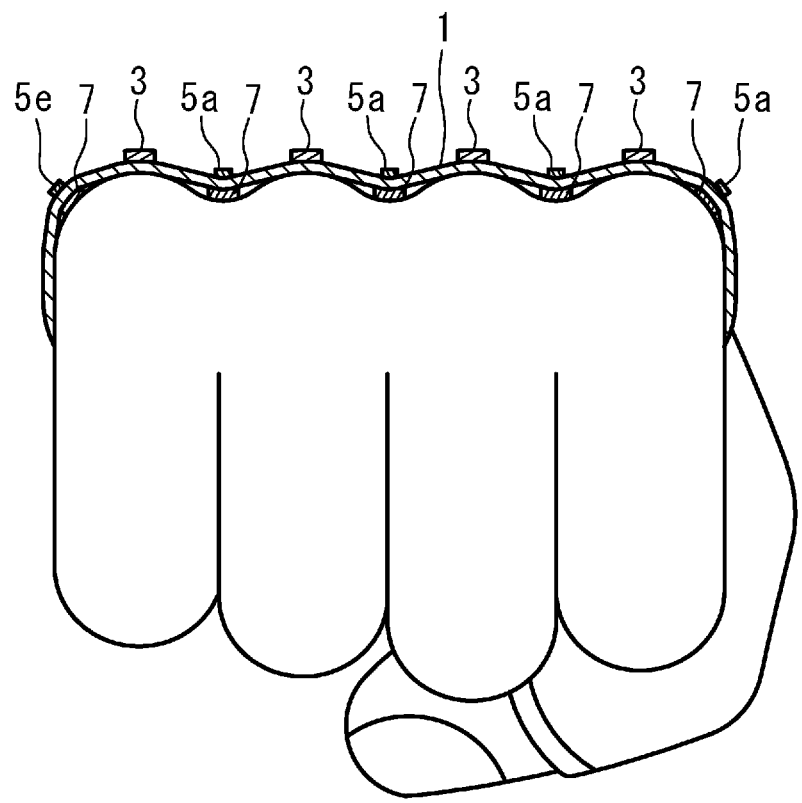
FIG. 3 is a schematic partial cross-sectional view illustrating the state of the data glove illustrated in FIG. 1 being worn.

The data glove illustrated in FIGS. 1 to 3 comprises: a glove body 1; four first strain sensors 2, four second strain sensors 3, and a flexible printed circuit board 4, the sensors and the circuit board being provided to the glove body 1; and a plurality of electric wirings 5 that connect the strain sensors 2, 3 to the flexible printed circuit board 4.

Specifically, the first strain sensors 2 are provided to an outer surface side of a dorsal side of the glove body 1, in regions corresponding to proximal interphalangeal joints (PIP joints: the second phalangeal joints) of the second to fifth fingers, respectively, and detect stretch and contraction of the glove body 1 in a proximal-distal direction. The second strain sensors 3 are provided to the outer surface side of the dorsal side of the glove body 1, in regions corresponding to metacarpophalangeal joints (MP joints: the third phalangeal joints, i.e., knuckles) of the second to fifth fingers, respectively, and detect stretch and contraction of the glove body 1 in a proximal-distal direction. The flexible printed circuit board 4 is provided to an outer surface side of a region corresponding to the back of the glove body 1. The wirings 5 are provided to the outer surface side of the dorsal side of the glove body 1 and connect the strain sensors 2, 3 to the flexible printed circuit board 4.

The data glove further comprises: anti-separating members 6 that reinforce the connection between the strain sensors 2, 3 and the wirings 5; a plurality of stretch-restraining portions 7 extending in the proximal-distal direction, on an inner surface side of the dorsal side of the glove body 1, in regions corresponding to areas between the metacarpophalangeal joints, respectively; and connection portions 8 which are provided on the inner surface side of the dorsal side of the glove body 1 so as to bridge the stretch-restraining portions 7 to thereby connect between the stretch-restraining portions 7.

The term "inner surface" of the glove body 1 as referred to herein means a surface of the side in contact with the hand of a wearer of the glove body 1; and the term "outer surface" means a surface of the side exposed to the outside when the glove body 1 is worn.

Glove Body

The glove body 1 is formed in a pouch-like shape designed to be worn on the wearer's hand, and more specifically, comprises five finger-accommodating portions individually accommodating the five fingers of the wearer, respectively. The glove body 1 is formed in such a manner that, for example, a palm-side cloth for covering the palm and palm-side portions of the five fingers is sewn to a dorsal-side cloth for covering the dorsum of the hand and dorsal-side portions of the five fingers.

Examples of a material for the glove body 1 include a knitted fabric, a woven fabric, a nonwoven fabric, rubber, leather, etc., among which those having elasticity are preferred and a knitted fabric is particularly preferred.

The five finger-accommodating portions of the glove body 1 respectively have openings through which the fingertips of the wearer i.e., the portions more distal than the distal interphalangeal joints of the wearer, are exposed, whereby inhibition of bending or extension, and discomfort for the wearer due to tension in the dorsal-side cloth during bending or extension of the fingers can be prevented. Furthermore, the exposure of the fingertips facilitates tasks performed with the fingertips and permits musical instrument playing etc. without any discomfort.

Moreover, in relation to the glove body 1 of the data glove illustrated in FIG. 1, a portion more proximal than the second strain sensors 3, which are in the regions corresponding to the metacarpophalangeal joints, includes slack 1a extending in a lateral direction (a direction perpendicular to the proximal-distal direction) on an extension of the second strain sensor 3. Specifically, in relation to the glove body 1, upon joining the dorsal-side cloth to the palm-side cloth, a portion corresponding to a wrist-side portion of the dorsum of the hand is to be sewn while providing gathers or tucks.

The slack 1a absorbs tension in the proximal-distal direction acting on the dorsal-side cloth of the glove body 1 upon bending or extension of the wrist, and prevents errors in detection values of the second strain sensors 3 due to bending or extension of the wrist.

The lower limit of load at 10% elongation per 1 cm in width of the fabric for forming the glove body 1 is preferably 0.01 N/cm, more preferably 0.02 N/cm, and still more preferably 0.03 N/cm. Meanwhile, the upper limit of the load at 10% elongation per 1 cm in width of the fabric for forming the glove body 1 is preferably 0.5 N/cm, more preferably 0.25 N/cm, and still more preferably 0.1 N/cm. When the load at 10% elongation per 1 cm in width of the fabric for forming the glove body 1 is less than the lower limit, the data glove may not sufficiently adhere to the hand of the wearer, and the strain sensors 2, 3 may be misaligned, which may result in inadequate detection accuracy. To the contrary, when the load at 10% elongation per 1 cm in width of the fabric for forming the glove body 1 is greater than the upper limit, the strain sensors 2, 3 may generate resistance against the fingers bending or extending, which may cause discomfort for the wearer of the data glove.

The term "load at 10% elongation" as referred to herein means a load (tension) that is required to elongate a measurement target 1.1 times in length.

Strain Sensor

The strain sensors 2, 3 electrically detect stretch and contraction of the glove body 1. The strain sensors 2, 3 are preferably overlaid on the surface side of the dorsal-side cloth constituting the glove body 1, such that strain sensors 2, 3 are less likely to cause discomfort for the wearer.

The first strain sensors 2 are provided in the regions corresponding to the proximal interphalangeal joints (PIP joints) of the second to fifth fingers; in other words, the first strain sensors 2 are attached onto the glove body 1 such that the distal ends thereof are arranged on the dorsal side of the middle phalanxes, and the proximal ends thereof are arranged on the dorsal side of the proximal phalanxes. The first strain sensor 2 is stretched when a proximal interphalangeal joint of the corresponding finger is bent, and contracts when a proximal interphalangeal joint of the corresponding finger is extended.

Furthermore, the second strain sensors 3 are provided in the regions corresponding to the metacarpophalangeal joints (MP joints) of the second to fifth fingers; in other words, the second strain sensors 3 are attached onto the glove body 1 such that the distal ends thereof are arranged on the dorsal side of the proximal phalanxes, and the proximal ends thereof are arranged on the dorsal side of the metacarpals. The second strain sensor 3 stretches when the metacarpophalangeal joint of the corresponding finger is bent, and contracts when the metacarpophalangeal joint of the corresponding finger is extended.

As the strain sensors 2, 3, a strain resistance element, of which resistance value changes upon stretch and contraction, can be used, and in particular, a CNT strain sensor with carbon nanotube (which may be hereinafter referred to as "CNT") is preferably used.

The CNT strain sensor can be configured to include, for example: an elastic sheet-like substrate attached onto the glove body; a CNT film overlaid on the surface side of the substrate; and a protective film that protects the CNT film.

An average thickness of the substrate of the CNT strain sensor may be, for example, within a range of no less than 10 μm and no greater than 5 mm.

A material for the substrate is not particularly limited as long as being flexible, and is exemplified by a synthetic resin, a rubber, a nonwoven fabric, a metal or a metal compound having a deformable shape or a deformable property, and the like.

Examples of the synthetic resin include a phenol resin (PF), an epoxy resin (EP), a melamine resin (MF), a urea resin (UF), an unsaturated polyester (UP), an alkyd resin, polyurethane (PUR), thermosetting polyimide (PI), polyethylene (PE), high density polyethylene (HDPE), intermediate density polyethylene (MDPE), low density polyethylene (LDPE), polypropylene (PP), polyvinyl acetate (PVC), polyvinylidene chloride, polystyrene (PS), polyvinyl acetate (PVA), an acrylonitrile-butadiene-styrene resin (ABS), an acrylonitrile-styrene resin (AS), polymethyl methacrylate (PMMA), polyamide (PA), polyacetal (POM), polycarbonate (PC), modified-polyphenylene ether (m-PPE), polybutylene terephthalate (PBT), polyethylene terephthalate (PET), cyclic polyolefin (COP), and the like.

Examples of the rubber include a natural rubber (NR), an isobutylene-isoprene rubber (IIR), an isoprene rubber (IR), an ethylene propylene rubber (EPDM), a butadiene rubber (BR), a urethane rubber (U), a styrene-butadiene rubber (SBR), a silicone rubber (Q), a chloroprene rubber (CR), a chlorosulphonated polyethylene rubber (CSM), an acrylonitrile-butadiene rubber (NBR), a chlorinated polyethylene (CM), an acrylic rubber (ACM), an epichlorohydrin rubber (CO, ECO), a fluororubber (FKM), dimethylpolysiloxane (PDMS), and the like. Of these rubbers, a natural rubber is preferred in light of strength.

The CNT film of the CNT strain sensor has a rectangular shape in a front view. An electrode is provided at both longitudinal end portions of the CNT film, and the wiring 5 is joined to the electrode by way of a conductive adhesive.

The CNT film is formed from a resin composition containing a large number of CNT fibers. Specifically, the CNT film includes: a plurality of CNT fiber bundles composed of a plurality of CNT fibers oriented in one direction; and a resin layer that covers a peripheral surface of the plurality of CNT fiber bundles. When a strain is applied to such a CNT film so as to extend in the proximal-distal direction, the state of contact among the CNT fibers changes, allowing the strain sensor to provide a change in resistance. It is to be noted that, in order to more efficiently detect a strain, the CNT fibers in the CNT film are preferably oriented in the direction of stretch and contraction.

The lower limit of the average thickness of the CNT film in an unloaded state is preferably 1 µm, and more preferably 10 µm. Meanwhile, the upper limit of the average thickness of the CNT film is preferably 1 mm, and more preferably 0.5 mm. When the average thickness of the CNT film is less than the lower limit, such a thin film may be difficult to be formed, and a resistance upon stretch may be excessive. To the contrary, when the average thickness of the CNT film is greater than the upper limit, the elasticity, in turn the resistance change or detection sensitivity in response to stretch and contraction, may be insufficient, and the wearer may feel discomfort.

It is to be noted that the CNT film may have either a monolayer structure in which the CNT fibers are planarly arranged substantially in parallel, or a multilayer structure. However, a multilayer structure is preferred in light of securing a certain electrical conductivity.

As the CNT fibers, either single-layered single wall nanotubes (SWNT) or multilayered multi-wall nanotubes (MWNT) may be used, of which MWNT is preferred in light of electrical conductivity and thermal capacity, and MWNT having a diameter within a range of no less than 1.5 nm and no greater than 100 nm is more preferred.

The resin layer of the CNT strain sensor comprises a resin as a principal component, and covers the peripheral surface of the plurality of CNT fiber bundles. Examples of the principal component of the resin layer include a synthetic resin, a rubber, etc. exemplified in connection with the material for the substrate, among which a rubber is preferred. Use of a rubber enables a sufficient function of protecting the CNT fibers to be exerted against a great strain.

The lower limit of the average width of the strain sensors 2, 3 formed from such a CNT strain sensor in the lateral direction in the unloaded state is preferably 0.5 mm, and more preferably 1 mm. Meanwhile, the upper limit of the average width of the strain sensors 2, 3 is preferably 10 mm, and more preferably 5 mm. When the average width of the strain sensors 2, 3 is less than the lower limit, the detection sensitivity may be insufficient, and the strain sensors 2, 3 may be torn upon bending or extension of the fingers. To the contrary, when the average width of the strain sensors 2, 3 is greater than the upper limit, the wearer may feel discomfort.

The lower limit of the average length of the strain sensors 2, 3 in the proximal-distal direction in the unloaded state is preferably 10 mm, and more preferably 15 mm. Meanwhile, the upper limit of the average length of the strain sensors 2, 3 is preferably 30 mm, and more preferably 25 mm. When the average length of the strain sensors 2, 3 is less than the lower limit, the strain sensors 2, 3 may not be correctly arranged on the dorsal side of the joints and may not be sufficiently stretched or contracted upon bending or extension of the joints, whereby movement of the fingers may not be accurately detected. To the contrary, when the average length of the strain sensors 2, 3 is greater than the upper limit, the first strain sensor 2 and the second strain sensor 3 may interfere with each other, leading to a failure to be aligned in the proximal-distal direction. It is to be noted that the average length of the first strain sensors 2 and the average length of the second strain sensors 3 may be different for each finger; and the average length of the first strain sensors 2 and the average length of the second strain sensors 3 may be different in the same finger.

The lower limit of the load at 10% elongation of the strain sensors 2, 3 is preferably 0.01 N, more preferably 0.03 N, and still more preferably 0.05 N. Meanwhile, the upper limit of the load at 10% elongation of the strain sensors 2, 3 is preferably 0.5 N, more preferably 0.3 N, and still more preferably 0.2 N. When the load at 10% elongation of the strain sensors 2, 3 is less than the lower limit, the strain sensors 2, 3 may stretch or contract due to factors other than bending and extension of the corresponding fingers, which may result in insufficient detection accuracy. To the contrary, when the load at 10% elongation of the strain sensors 2, 3 is greater than the upper limit, a reaction force upon stretch may increase, which may cause discomfort for the wearer.

The lower limit of the resistance value of each strain sensor 2, 3 in the unloaded state is, for example, preferably 10Ω, and more preferably 100Ω. Meanwhile, the upper limit of the resistance value of the strain sensors 2, 3 in the unloaded state is preferably 100 kΩ, and more preferably 10 kΩ. When the resistance value of the strain sensors 2, 3 in the unloaded state is less than the lower limit, the electric current for detecting stretch may increase, which may increase the power consumption. To the contrary, when the resistance value of the strain sensors 2, 3 in the unloaded state is greater than the upper limit, the voltage of a detection circuit may increase, which may result in difficulty in downsizing and power-saving.

The rate of change in the resistance value by stretching of each strain sensor 2, 3 is to be appropriately selected so as to achieve sufficient detection accuracy, and for example the ratio of a resistance value of the strain sensors 2, 3 in the 10% elongated state to a resistance value of the strain sensors 2, 3 in the unloaded state is, for example, within a range of no less than twofold and no greater than twentyfold.

The strain sensors 2, 3 are attached to the glove body 1 by using an adhesive that does not inhibit stretch and contraction of the glove body 1 and of the strain sensors 2, 3. Examples of such an adhesive include moisture-curable polyurethane adhesives and the like.

Flexible Printed Circuit Board

A flexible printed circuit board 4 comprises a connector 4a for connecting the wiring 5 to a computer or the like (not illustrated), the connector 4a being mounted to a proximal end side thereof. Only a distal end of the flexible printed circuit board 4 is fixed to the glove body 1, such that the connector 4a is less likely to be pressed against the back of the hand to cause discomfort for the wearer.

Wiring

The wirings 5 are provided to the surface of the glove body 1, and connect the strain sensors 2, 3 to the flexible printed circuit board 4. Specifically, the wirings 5 respectively connect the distal ends of the first strain sensors 2 to the flexible printed circuit board 4, and include: four distal connection portions 5a, each central portion of which is provided to be superposed on the stretch-restraining portion 7 as described later; four proximal connection portions 5b respectively connecting the proximal ends of the second strain sensor 3 to the flexible printed circuit board 4; four intermediate connection portions 5*c* respectively connecting the proximal ends of the first strain sensors 2 to the distal ends of the second strain sensor 3 for the respective fingers; an interconnection portion 5*d* extending from the four intermediate connection portions 5*c* and interconnected on the palm side of the glove body 1; and a ground connection portion 5*e* extending from the vicinity of the fifth finger of the interconnection portion 5*d* to be superposed on the stretch-restraining portions 7 as described later, and reaches the flexible printed circuit board 4.

The wiring 5 can be formed from an electrically conductive thread (filament). An electrically conductive thread made of metal such as iron can be used for the wiring 5, and a stainless-steel thread is preferably used as the electrically conductive thread made of metal. A stainless steel thread has advantages that the electric resistance is low, and a change in electric resistance is relatively small even after washing the data glove. It is to be noted that an insulating thread coated with a conductive material or a conductive material-blended thread can be used as the thread constituting the wiring 5.

The electric resistance per 10 cm of the thread constituting the wiring 5 is preferably less than 100Ω, and still more preferably less than 50Ω. This enables the electric resistance of the wiring 5 to be reduced, and a sensing signal from the strain sensors 2, 3 to be correctly transmitted to the flexible printed circuit board 4. It is to be noted that the term "resistance value per 10 cm" as referred to herein means a resistance value for 10 cm of the thread upon application of a voltage of 5 V, that can be measured by using a general-purpose tester.

The wiring 5 is elastic, and provided so as to transform following the transformation of the glove body 1. Specifically, the wiring 5 is formed by stretch seam with an electrically conductive thread. It is to be noted that the term "stretch seam" as referred to herein means "sewing an elastic cloth such that the cloth will not come apart at the seam, and the seam will not loosen by stretching and contracting the cloth" as defined under JIS-B-9003 (1999). Specifically, the wiring 5 of the present embodiment can be formed by covering stitch (single sided fancy stitch) or the like.

The upper limit of the load at 10% elongation of the wiring 5 is preferably 0.1 N, and more preferably 0.05 N. Meanwhile, the lower limit of the load at 10% elongation of the wiring 5 is not particularly limited. When the load at 10% elongation of the wiring 5 is greater than the upper limit, stretch and contraction of the glove body 1 may be inhibited, causing discomfort for the wearer, or stretch and contraction of the glove body 1 may be nonhomogeneous, resulting in insufficient detection accuracy due to misalignment of the strain sensors 2, 3.

Alternatively, the wiring 5 of the present invention may be formed by directly making a stitch with an electrically conductive thread on the glove body 1, or may be provided by making a stitch with an electrically conductive thread on a separate elastic cloth beforehand and then bonding the cloth to the glove body 1 by way of an adhesive. As the adhesive for bonding the cloth on which the wiring 5 is formed, for example, a hot-melt adhesive or the like can be used.

Anti-Separating Member

The anti-separating member 6 is provided so as to cover the electrode formed at the end of the strain sensors 2, 3 as well as the wiring 5 connected to the electrode, and prevent the wiring 5 from separating from the electrode of the strain sensors 2, 3. As the anti-separating member 6, for example, a knitted material, a woven fabric or the like is used, and the anti-separating member 6 is bonded to the glove body 1 by way of an adhesive, so as to cover the portion where the electrode and the wiring are fixed.

Stretch-Restraining Portion

The stretch-restraining portion 7 is provided on the dorsal side of the glove body 1 along the proximal-distal direction, in regions corresponding to area between the proximal interphalangeal joints of the second to fifth fingers, a region corresponding to a side surface of the proximal interphalangeal joint of the second finger in which the side surface thereof faces the first finger, and a region corresponding to a side surface of the proximal interphalangeal joint of the fifth finger in which the side surface thereof is opposite from the fourth finger. In other words, the second strain sensors 3 are respectively provided between the stretch-restraining portions 7.

The stretch-restraining portion 7 is overlaid on the glove body 1, thereby partially restraining the stretch of the glove body 1. Therefore, as illustrated in FIG. 3, the stretch-restraining portions 7 are respectively positioned to the valley-like portions between the metacarpophalangeal joints, where a degree of stretch and contraction of the skin is small when the wearer of the data glove bends the metacarpophalangeal joints, namely, the portions corresponding to areas between the fingers on the dorsal side. As a result, the second strain sensors 3, which are arranged between the stretch-restraining portions 7, are enabled to be relatively accurately arranged on the metacarpophalangeal joints. The load at 10% elongation of the stretch-restraining portions 7 is preferably greater than that of the strain sensors 2, 3.

The proximal end of the stretch-restraining portion 7 is located more proximally than the adjacent second strain sensor 3, and the distal end of the stretch-restraining portion 7 is located more distally than the adjacent second strain sensors 3. As a result, the force acting on the cloth of the glove body 1 in the lateral direction can be prevented from acting as tension on the second strain sensor 3 in the proximal-distal direction.

In addition, in the data glove, the stretch-restraining portion 7 is overlaid on the inner surface of the glove body 1. As a result, the stretch-restraining portion 7 serves also as an anti-slip member for preventing misalignment of the glove body 1 in the proximal-distal direction in relation to the dorsum of the wearer's hand.

Furthermore, the stretch-restraining portion 7 also has a function of preventing an excessive force from acting on and tearing the portion where the wiring 5 is provided to be superposed.

A material for forming the stretch-restraining portion 7 may be either similar to those exemplified in relation to the wiring 5, or a synthetic rubber, a natural rubber, and the like. The stretch-restraining portion 7 may be formed by applying such a material to the glove body 1, or by bonding a material having been shaped into a strip to the glove body 1 by way of an adhesive.

The lower limit of the average width of the stretch-restraining portion 7 in the lateral direction is preferably 0.5 mm, and more preferably 1 mm. Meanwhile, the upper limit of the average width of the stretch-restraining portion 7 is preferably 10 mm, and more preferably 5 mm. When the average width of the stretch-restraining portion 7 is less than the lower limit, the strength of the stretch-restraining portion 7 may be insufficient, and misalignment of the second strain sensors 3 in the lateral direction may not be sufficiently restrained. To the contrary, when the average width of the stretch-restraining portions 7 is greater than the upper limit, stretch and contraction of the glove body 1 may be excessively inhibited, causing discomfort for the wearer, or stretch and contraction of the second strain sensors 3 may be hindered, resulting in insufficient detection sensitivity.

The lower limit of the average thickness of the stretch-restraining portion 7 is preferably 0.05 mm, and more preferably 0.1 mm. Meanwhile, the upper limit of the average thickness of the stretch-restraining portion 7 is preferably 2 mm, and more preferably 1 mm. When the average thickness of the stretch-restraining portion 7 is less than the lower limit, stretch and contraction of the glove body 1 may not be sufficiently restrained. To the contrary, when the average thickness of the stretch-restraining portion 7 is greater than the upper limit, the wearer may feel discomfort.

The lower limit of the load at 10% elongation of the stretch-restraining portion 7 is preferably 0.2 N, and more preferably 0.5 N. Meanwhile, the upper limit of the load at 10% elongation of the stretch-restraining portion 7 is preferably 5 N, and more preferably 2 N. When the load at 10% elongation of the stretch-restraining portion 7 is less than the lower limit, stretch and contraction of the glove body 1 may not be sufficiently restrained. To the contrary, when the load at 10% elongation of the stretch-restraining portions 7 is greater than the upper limit, the wearer may feel discomfort.

Connection Portion

The connection portion 8 is provided on the inner surface of the glove body 1 so as to bridge the stretch-restraining portions 7, and is preferably provided to extend in the lateral direction so as to connect between the vicinities of the proximal ends of the stretch-restraining portions 7. The connection portion 8 partially restrains stretch and contraction of the glove body 1 in the proximal-distal direction, and serves also as an anti-slip member in relation to the dorsal of the hand of the wearer. The load at 10% elongation of the connection portion 8 is preferably greater than that of the strain sensors 2, 3.

The connection portion 8 can be formed in a similar manner to the stretch-restraining portions 7, in terms of material and method.

Due to providing the connection portion 8, when any one of the fingers moves, the first strain sensor 2 or the second strain sensor 3 on the adjacent finger can be prevented from being misaligned as the cloth of the glove body 1 is moved, which can in turn improve the accuracy of detecting the movement of the fingers. In addition, the connection portion 8 maintains a constant distance between the adjacent stretch-restraining portions 7, and restrains the tension in the lateral direction from acting on the cloth of the glove body 1 located between the adjacent stretch-restraining portions 7 and from influencing the stretch and contraction of the second strain sensors 3. Namely, the connection portion 8 connects and bundles the stretch-restraining portions 7, thereby inhibiting occurrence of detection errors due to misalignment of the strain sensors 2, 3 following movement of the fingers, or due to stretch and contraction of the strain sensors 2, 3 on an unintended finger.

The lower limit of the average width of the connection portion 8 in the lateral direction is preferably 0.5 mm, and more preferably 1 mm. Meanwhile, the upper limit of the average width of the connection portion 8 is preferably 10 mm, and more preferably 5 mm. When the average width of the connection portion 8 is less than the lower limit, the strength of the connection portion 8 may be insufficient, and the detection accuracy may not be sufficiently improved. To the contrary, when the average width of the connection portion 8 is greater than the upper limit, stretch and contraction of the glove body 1 may be excessively hindered, causing discomfort for the wearer.

The lower limit of the average thickness of the connection portion 8 is preferably 0.05 mm, and more preferably 0.1 mm. Meanwhile, the upper limit of the average thickness of the connection portion 8 is preferably 2 mm, and more preferably 1 mm. When the average thickness of the connection portion 8 is less than the lower limit, stretch and contraction of the glove body 1 may not be sufficiently restrained. To the contrary, when the average thickness of the connection portion 8 is greater than the upper limit, the wearer may feel discomfort.

The lower limit of the load at 10% elongation of the connection portion 8 is preferably 0.2 N, and more preferably 0.5N. Meanwhile, the upper limit of the load at 10% elongation of the connection portion 8 is preferably 5 N, and more preferably 2 N. When the load at 10% elongation of the connection portion 8 is less than the lower limit, stretch and contraction of the glove body 1 may not be sufficiently restrained. To the contrary, when the load at 10% elongation of the connection portion 8 is greater than the upper limit, the wearer may feel discomfort.

Advantages

The data glove is able to detect movement of the proximal interphalangeal joints and the metacarpophalangeal joints relatively accurately, by virtue of the strain sensors 2, 3 arranged on the dorsal side of the proximal interphalangeal joints and the metacarpophalangeal joints of the second to fifth fingers detecting stretch and contraction of the cloth of the glove body 1, which stretches and contracts with the bending and extension of the proximal interphalangeal joints and the metacarpophalangeal joints.

In addition, since the strain sensors 2, 3 for detecting stretch of the glove body 1 are thin enough to adhere to the hand and have a small reaction force, the strain sensors 2, 3 are less likely to cause discomfort for the wearer. Therefore, a wearer of the data glove is enabled to perform delicate actions such as sports or musical instrument playing as usual, whereby the natural movement of the hand can be converted into data.

Second Embodiment

Figure 4:
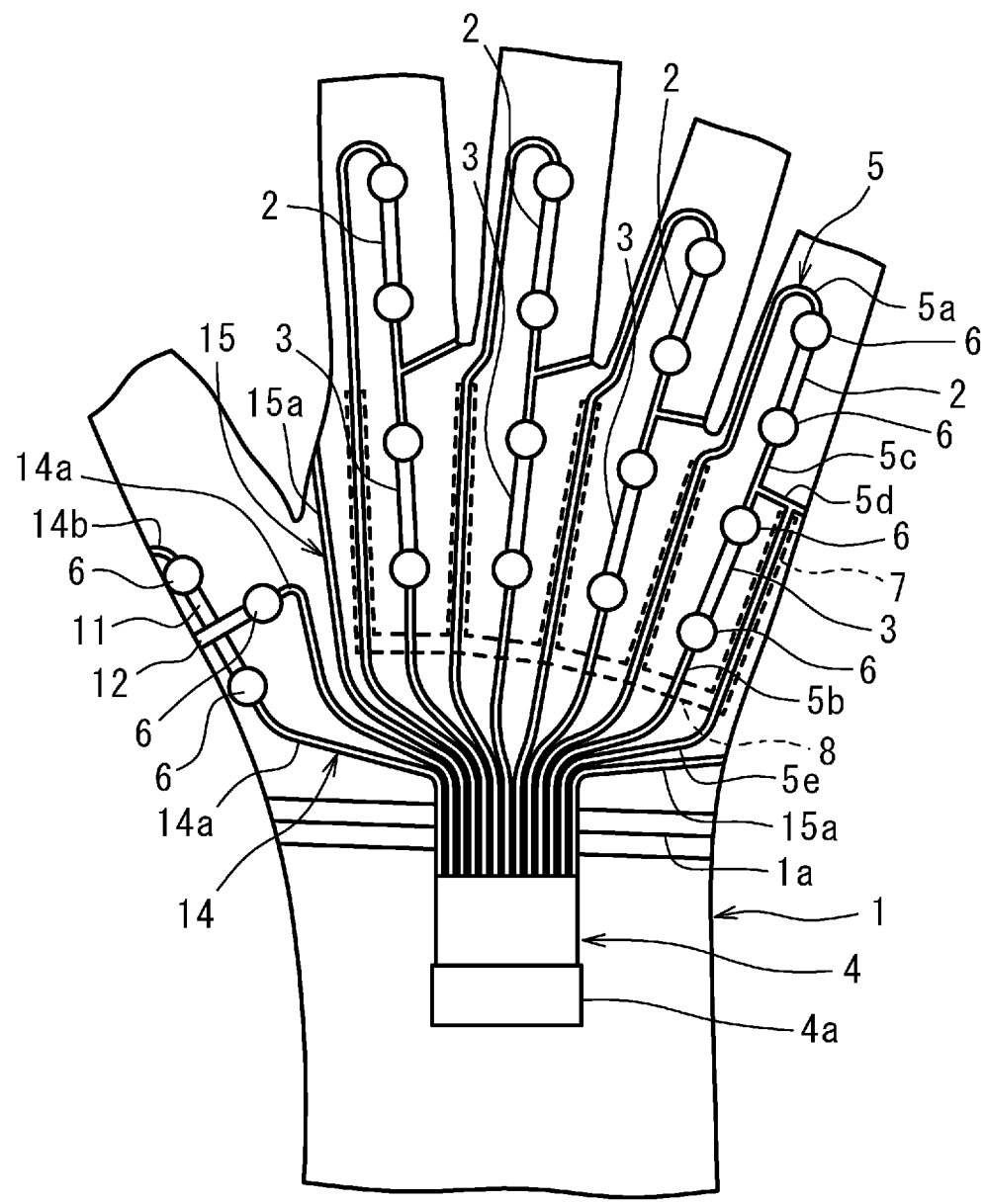
FIG. 4 is a schematic plan view illustrating a data glove according to an embodiment different from that illustrated in FIG. 1.
Figure 5:
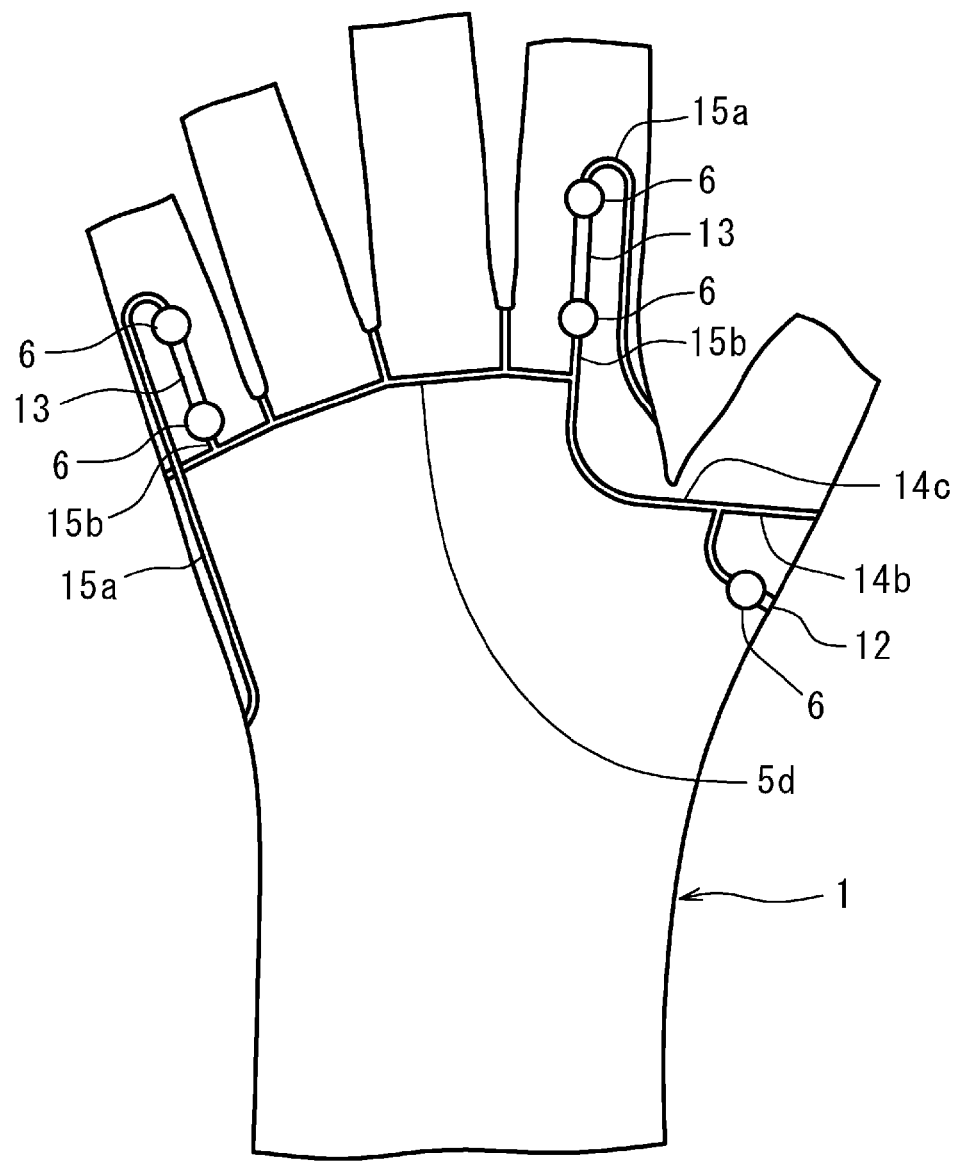
FIG. 5 is a schematic back view of the data glove illustrated in FIG. 4.
Figure 6:
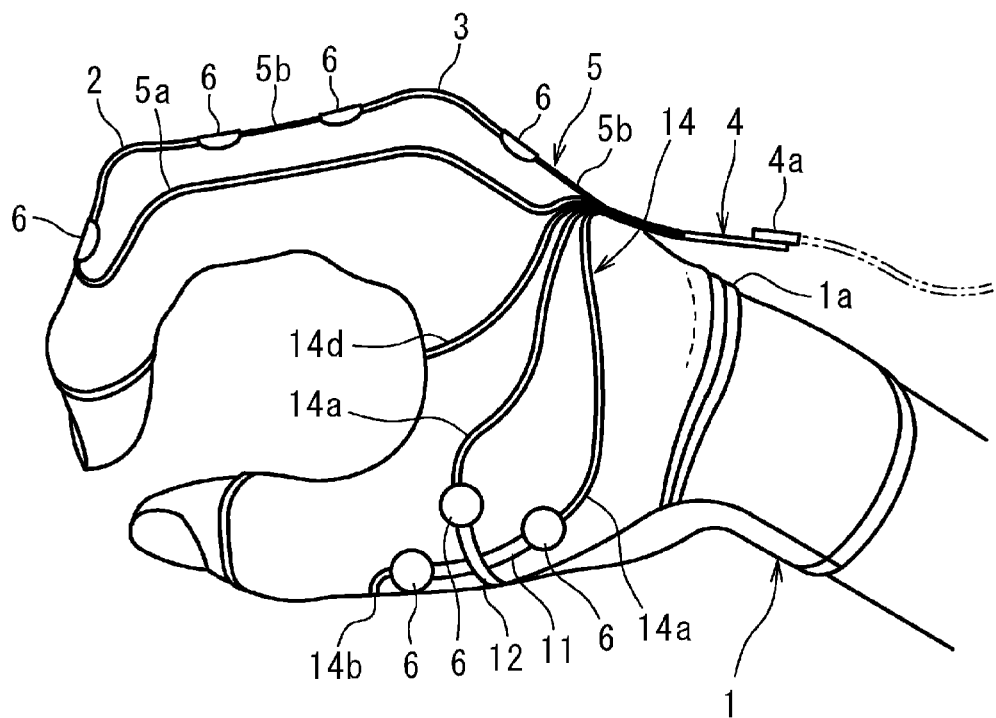
FIG. 6 is a schematic perspective view illustrating a state of the data glove illustrated in FIG. 4 being worn.

The data glove illustrated in FIGS. 4 to 6 comprises a glove body 1; four first strain sensors 2, four second strain sensors 3, one third strain sensor 11, one fourth strain sensor 12, and two fifth strain sensors 13, all of which are provided on a dorsal side of the glove body 1; a flexible printed circuit board 4; a plurality of wirings 5 connecting the first and second strain sensors 2, 3 to the flexible printed circuit board 4; a plurality of second wirings 14 connecting the third and fourth strain sensors 11, 12 to the flexible printed circuit board 4; and a plurality of third wirings 15 connecting the fifth strain sensors 13 to the flexible printed circuit board 4.

In addition, the data glove further comprises: an anti-separating member 6 that reinforces the connection between the strain sensors 2, 3, 11, 12, 13 and the wirings 5, 14, 15 extending from the sensors; a plurality of stretch-restraining portions 7 extending in a proximal-distal direction on an inner surface of the glove body 1, in regions respectively corresponding to areas between proximal interphalangeal joints; and a connection portion 8 which is provided on the dorsal side of the glove body 1 so as to bridge the stretch-restraining portions 7, and which connects between the stretch-restraining portions 7.

Configurations of the strain sensors 2, 3, the wiring 5, the anti-separating member 6, the stretch-restraining portion 7, and the connection portion 8 in relation to the data glove illustrated in FIG. 4 are similar to those of the strain sensors 2, 3, the wiring 5, the anti-separating members 6, the stretch-restraining portions 7, and the connection portion 8 in relation to the data glove illustrated in FIG. 1; therefore, explanation thereof is omitted herein.

Strain Sensor

The third strain sensor 11 is provided on an outer surface side of the dorsal side of the glove body 1 along the proximal-distal direction, in a region corresponding to the metacarpophalangeal joint of the first finger. Namely, the third strain sensor 11 is attached onto the glove body 1 such that the distal end thereof is arranged on the dorsal side of the proximal phalanx, and the proximal end thereof is arranged on the dorsal side of the metacarpal. Specifically, the third strain sensor 11 is provided substantially in parallel with a seam between a dorsal-side cloth and a palm-side cloth of the glove body 1, in the vicinity of the side edge of the palm-side cloth. It is to be noted that the dorsal side of the first finger means an outer side (extensor side) in relation to a direction of bending and extension of the metacarpophalangeal joint and the interphalangeal joint, and is oriented differently from the dorsal side of the second to fifth fingers when the data glove is worn. Therefore, the third strain sensor 11 stretches when the metacarpophalangeal joint of the first finger is bent, and contracts when the metacarpophalangeal joint of the first finger is extended. As a result, the third strain sensor 11 detects stretch and contraction of the glove body 1 in the proximal-distal direction.

The fourth strain sensor 12 is provided on an outer surface side of the dorsal side of the glove body 1 along the lateral direction, in a region corresponding to the metacarpophalangeal joint of the first finger. More specifically, one end of the fourth strain sensor 12 is arranged at a position corresponding to an area between the metacarpophalangeal joint of the first finger and the metacarpal of the second finger; and another end of the fourth strain sensor 12 is arranged at a position corresponding to an area of the metacarpophalangeal joint of the first finger, the area being opposite from the second finger. Therefore, the fourth strain sensor 12 is mainly extending on the dorsal-side cloth of the glove body 1, and is provided such that the another end of the fourth strain sensor 12 is located on the palm-side cloth in the vicinity of the seam between the dorsal-side cloth and the palm-side cloth of the glove body 1. The fourth strain sensor 12 stretches when swinging the metacarpal of the first finger to the palm side, and contracts when swinging the metacarpal of the first finger to the dorsal side. As a result, the fourth strain sensor 12 detects stretch and contraction of the glove body 1 in the lateral direction.

The third strain sensor 11 and the fourth strain sensor 12 are preferably provided so as to intersect each other. In addition, an intersection angle formed by the third strain sensor 11 and the fourth strain sensor 12 is preferably a substantially right angle. It is to be noted that the term "substantially right angle" as referred to herein means that the angle formed by the sensors is no less than 60°, and preferably no less than 80°.

The fifth strain sensors 13 are provided to the palm side of the outer surface side along the proximal phalanxes of the second and fifth fingers, and detect stretch and contraction of the glove body 1 in the proximal-distal direction. Specifically, the fifth strain sensor 13 stretches when the corresponding finger is extended toward the dorsal side, and contracts when the corresponding finger is returned to the palm side. Moreover, the fifth strain sensors 13 are provided so as not to overlap with the metacarpophalangeal joints and the proximal interphalangeal joints, such that the metacarpophalangeal joints and the proximal interphalangeal joints are not hindered from bending.

A sensor similar to the strain sensors 2, 3 can be used for the strain sensors 11, 12, 13. In addition, the anti-separating members 6 are provided to the strain sensors 11, 12, 13, in a similar manner to the strain sensors 2, 3.

Wiring

The second wiring 14 includes: two proximal connection portions 14a respectively connecting the proximal ends of the strain sensors 11, 12 to the flexible printed circuit board 4; an intermediate connection portion 14b interconnecting the distal ends of the strain sensors 11, 12; and an interconnection portion 14c connecting the intermediate connection portion 14b to an interconnection portion 5d of the wiring 5. A material, etc. for the second wiring 14 can be similar to those for the wiring 5.

The third wiring 15 includes: a distal connection portion 15a connecting the distal end of the fifth strain sensor 13 to the flexible printed circuit board 4; and an interconnection portion 15b connecting the proximal end of the fifth strain sensor 13 to the interconnection portion 5d of the wiring 5. A material, etc. for the third wiring 15 can be similar to those for the wiring 5.

Advantages

Since the data glove further includes the third strain sensor 11 and the fourth strain sensor 12 provided on the dorsal side of the metacarpophalangeal joint of the first finger, the data glove can measure stretch in two directions of the region corresponding to the dorsal side of the metacarpophalangeal joint of the first finger of the glove body 1, and is therefore able to detect the bending and extension of the first finger as well as the swinging thereof in the lateral direction. Therefore, the data glove is able to detect three-dimensional movement of the first finger relatively accurately.

Due to the third strain sensor 11 and the fourth strain sensor 12 being provided to the first finger, it is possible to detect the bending and extension of the joint in the dorsal-palmar direction, as well as more accurately detecting the movement of the first finger which frequently swings in the lateral direction that is orthogonal to the dorsal-palmar direction; and eventually, it is possible to capture the movement of the entire hand more accurately.

Specifically, when the data glove is used to detect motions of the hand that plays a keyboard instrument, the fourth strain sensor 12 detects the swinging of the first finger in the lateral direction, thereby allowing for detecting a keystroke; and the third strain sensor 11 detects the bending and extension of the metacarpophalangeal joint of the first finger, thereby allowing for capturing a change in the position of the first finger arranged on the keyboard, e.g. passing the first finger underneath the second to fifth fingers, etc. It is to be noted that the movement of the distal interphalangeal joints is substantially in conjunction with the proximal interphalangeal joints, and can therefore be estimated from the movement of the proximal interphalangeal joints detected by the fourth strain sensor 12, without individually providing sensors.

In addition, since the third strain sensor 11 and the fourth strain sensor 12 are provided so as to intersect each other, the data glove is able to detect stretch and contraction of substantially the same region of the glove body 1 in two directions, and to more accurately detect movement of the fingers. In particular, since the intersection angle formed by the third strain sensor 11 and the fourth strain sensor 12 is a substantially right angle, the bending and extension in the dorsal-palmar direction as well as the swinging in the lateral direction can be detected with relatively high accuracy.

Due to comprising the fifth strain sensors 13 in the regions corresponding to the proximal phalanxes on the palm side of the second and fifth fingers, the data glove is able to detect outward extension of the second and fifth fingers, i.e., movement of extending the metacarpophalangeal joint outward.

Third Embodiment

Figure 7:
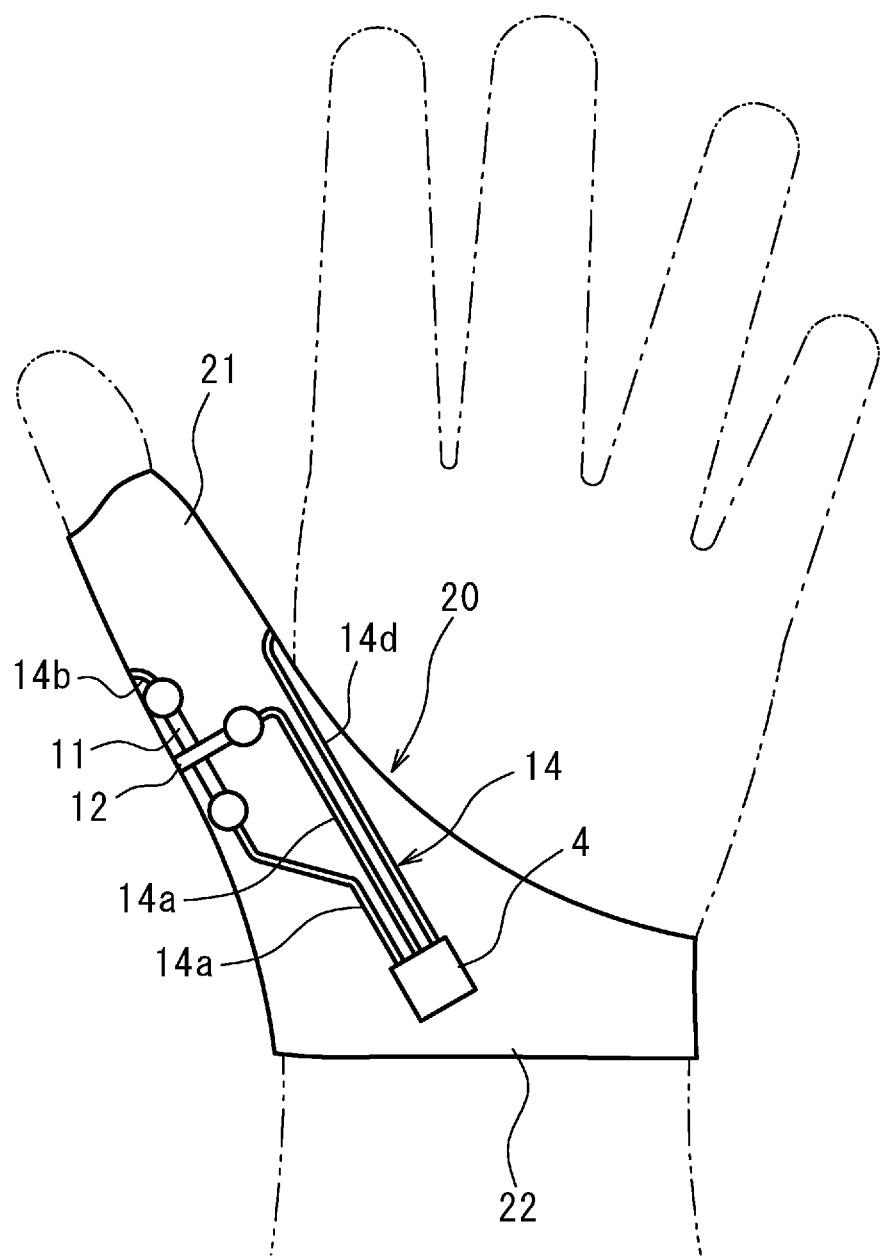
FIG. 7 is a schematic plan view illustrating a data glove according to another embodiment different from those illustrated in FIGS. 1 and 4.

The data glove illustrated in FIG. 7 is specialized in detecting movement of the first finger. The data glove comprises: a glove body 20; and a third strain sensor 11 and a fourth strain sensor 12 provided in a region corresponding to the vicinity of the metacarpophalangeal joint of the first finger of the glove body 20. The data glove further comprises: a flexible printed circuit board 4; and a wiring 14 connecting the flexible printed circuit board 4 to the strain sensors 11, 12.

The glove body 20 of the data glove accommodates only the first finger, similar to well-known thumb supporters, and includes: a finger-accommodating portion 21 for accommodating the first finger; and a fixing portion 22 to be wrapped around the wrist.

Therefore, the third strain sensor 11 and the fourth strain sensor 12 are provided to the finger-accommodating portions 21; and the flexible printed circuit board 4 is provided to the dorsal side of the fixing portion 22.

The wiring 14 includes: two proximal connection portions 14a respectively connecting the proximal ends of the strain sensors 11, 12 to the flexible printed circuit board 4; an intermediate connection portion 14b interconnecting the distal ends of the strain sensors 11, 12; and a distal connection portion 14d connecting the intermediate connection portion 14b to the flexible printed circuit board 4.

Except for the foregoing, detailed configurations of the data glove in relation to the glove body 20, the third strain sensor 11, the fourth strain sensor 12, the flexible printed circuit board 4, and the wiring 14 are similar to those of the data glove in relation to the glove body 20, the third strain sensor 11, the fourth strain sensor 12, the flexible printed circuit board 4, and the wiring 14 illustrated in FIGS. 1 to 3. Therefore, explanation thereof is omitted herein.

By virtue of detection of movement of the first finger by using the data glove, it is possible to determine whether movement made by a test subject is likely to cause tenosynovitis or jammed finger.

Fourth Embodiment

Figure 8:
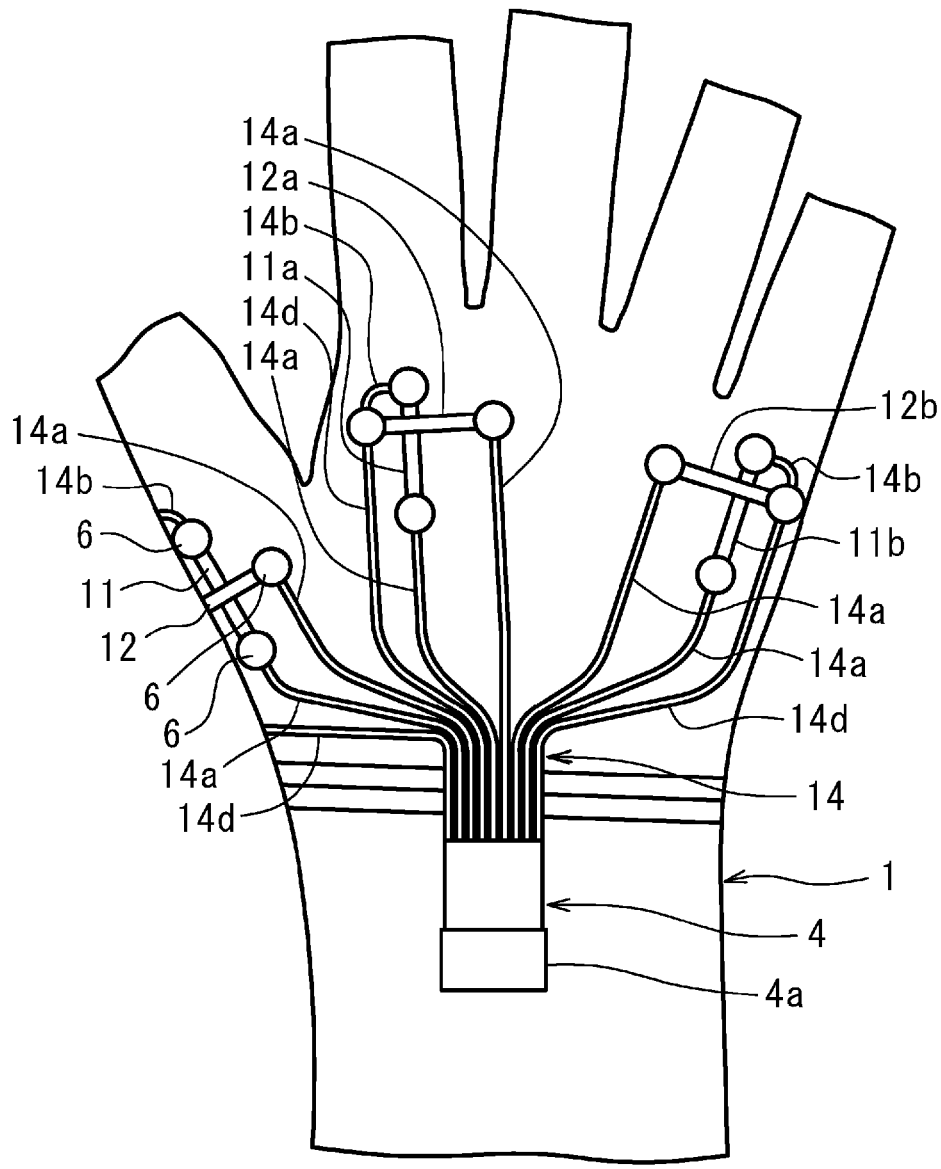
FIG. 8 is a schematic plan view illustrating a data glove according to still another embodiment different from those illustrated in FIGS. 1, 4 and 7.

A data glove illustrated in FIG. 8 detects movement of the first, second and fifth fingers. The data glove comprises: a glove body 1; third strain sensors 11, 11a, 11b and fourth strain sensors 12, 12a, 12b being respectively provided in regions corresponding to the vicinities of the metacarpophalangeal joints of the first, second and fifth fingers of the glove body 1; a flexible printed circuit board 4; and a wiring 14 connecting the strain sensors 11, 11a, 11b, 12, 12a, 12b to the flexible printed circuit board 4.

The glove body 1, the third strain sensor 11, the fourth strain sensor 12, and the flexible printed circuit board 4 of the data glove are similar to the glove body 1, the third strain sensor 11, the fourth strain sensor 12, and the flexible printed circuit board 4 of the data glove illustrated in FIG. 7. Therefore, explanation thereof is omitted herein.

The third strain sensors 11a, 11b of the second and fifth fingers, respectively, mainly detect stretch and contraction of the glove body 1 in the proximal-distal direction. As a result, the third strain sensors 11a, 11b detect the bending and extension of the metacarpophalangeal joints of the second and fifth fingers, respectively.

Meanwhile, the fourth strain sensors 12a, 12b of the second and fifth fingers mainly detect stretch and contraction of the glove body 1 in the lateral direction that is orthogonal to the proximal-distal direction. As a result, the fourth strain sensors 12a, 12b detect the swinging of the second and fifth fingers around the metacarpophalangeal joints in the lateral direction. In order to detect such swinging of the second and fifth fingers in the lateral direction, the fourth strain sensors 12a, 12b are preferably provided distally to the center of the metacarpophalangeal joint.

The wiring 14 of the data glove includes: a proximal connection portion 14a respectively connecting one end of the strain sensors 11, 11a, 11b, 12, 12a, 12b to the flexible printed circuit board 4; an intermediate connection portions 14b interconnecting the other ends of the third strain sensor 11, 11a, 11b and the fourth strain sensors 12, 12a, 12b; and a distal connection portion 14d connecting the other ends of the fourth strain sensors 12, 12a, 12b to the flexible printed circuit board 4. The intermediate connection portion 14b and the distal connection portion 14d are constituted of a single wiring extending from the distal end of the respective third strain sensors 11, 11a, 11b, via the other end of the respective fourth strain sensors 12, 12a, 12b of the same finger, to the flexible printed circuit board 4.

According to the present embodiment, it is possible to extensively detect movement of the fingers to put together or spread apart, particularly in relation to the first, second and fifth fingers. Separation and approximation between the third and fourth fingers can be inferred from the movement of the second and fifth fingers.

Other Embodiments

The above-described embodiments do not limit the configurations of the present invention. Therefore, omissions, replacements, and/or additions of constituent features of each component in the above-described embodiments can be made based on the disclosure of the specification of the present application and common technical knowledge, and thus, all such modifications thereof shall be construed as falling within the scope of the present invention.

The data glove is only required to comprise at least two strain sensors in a region corresponding to at least one finger among the first to fifth fingers on the dorsal side of the glove body, and may have the first and second strain sensors only in a region corresponding to any one finger, or may include the third and fourth strain sensors only in a region corresponding to any one finger.

In addition, in the above-described embodiments, the numbers affixed to the strain sensors are merely for the sake of convenience. For example, if further strain sensors for mainly detecting stretch and contraction in the lateral direction are provided in the same region in the vicinities of the second strain sensors of the first embodiment illustrated in FIG. 1, the second strain sensors and the further strain sensors correspond to the third strain sensors and the fourth strain sensors in the second to fifth embodiments. It is to be noted that the phrase "mainly detecting" as referred to herein means that, if a directional component is divided into a component in an intended direction providing a detection value and a component in another direction orthogonal to the intended direction, the component in the intended direction is, preferably at least 1.5 times, greater than the component in the orthogonal direction.

Furthermore, in relation to the data glove, a strain sensor for detecting stretch and contraction of the glove body in the proximal-distal direction is preferably provided in the region corresponding to the metacarpophalangeal joint of at least one finger of the second to fifth fingers on the dorsal side of the glove body; however, the present invention is not limited thereto.

In particular, in relation to the data glove, if two strain sensors being provided to at least one finger detect stretch and contraction of the glove body in the proximal-distal direction, the strain sensors are preferably arranged in the regions corresponding to the metacarpophalangeal joint and the proximal interphalangeal joints, respectively; however, the present invention is not limited thereto.

Moreover, in relation to the data glove, if two strain sensors being provided to at least one finger detect stretch and contraction of the glove body in a direction crossing with each other, the two strain sensors are preferably provided in the regions corresponding to the metacarpophalangeal joints; however, the present invention is not limited thereto.

Alternatively, in relation to the data glove, the third strain sensor and the fourth strain sensor may be separately provided so as not to intersect each other; and an angle formed by the sensors may not be a substantially right angle. Specifically, the other end of the fourth strain sensor (the side farther from the second finger) may be arranged on the proximal phalanx which is more distal than the third strain sensor; and the other end of the fourth strain sensor may be arranged on the metacarpal which is more proximal than the third strain sensor. Further, one proximal end of the third strain sensor may be arranged more distally than the fourth strain sensor. Specifically, due to overlap of the third strain sensor with the proximal interphalangeal joint, it is possible to detect movement of the fingertips in the proximal-distal direction and the lateral direction.

The data glove may include a strain sensor for detecting stretch and contraction of the glove body in the lateral direction in a region other than the region corresponding to the vicinity of the metacarpophalangeal joint, for detecting the swinging of the fingers in the lateral direction. In this case, the strain sensor is preferably provided at a position where movement of the joint applies tension to the skin, i.e., a position where the glove body stretches and contracts.

In relation to the data glove, the stretch-restraining portions and the connection portion may be changed in location or may be omitted.

In relation to the data glove, the stretch-restraining portion may not be superposed on the wiring. For example, the stretch-restraining portion and the wiring may be arranged in parallel, or may be arranged so as to intersect each other in a plan view.

In relation to the data glove, the wiring may be used as the stretch-restraining portion or the connection portion. In other words, the wiring may also serve to restrain stretch of the glove body 1, without the stretch-restraining portions and the connection portion being provided as independent components. In such a case, the width and thickness of the wiring may be partially increased. Alternatively, the stretch-restraining portion and the connection portion may be provided on the outer surface of the glove body 1. Still alternatively, the stretch-restraining portion and the connection portion may be formed on opposite surfaces of the glove body 1.

In relation to the data glove, the tip ends of the finger-accommodating portions may also be closed, such that the glove body covers the fingertips of the wearer.

Moreover, the data glove may also be configured such that the wiring is connected to an external processing unit without a flexible printed circuit board. Alternatively, an arithmetic unit for processing signals, a wireless communication device, etc. may be mounted on the flexible printed circuit board.

In relation to the data glove, a slip resistance layer may be formed at positions corresponding to both ends of the strain sensor for the proximal interphalangeal joint, on the inner surface of the dorsal-side cloth of the glove body. As a result, misalignment of the strain sensor for the proximal interphalangeal joint in the proximal-distal direction can be prevented during measurement, and the detection accuracy in terms of movement of the proximal interphalangeal joint can be improved. Examples of a material that may be used for the slip resistance layer include a synthetic rubber, a natural rubber, and the like.

The data glove may include a strain sensor in any region other than the regions corresponding to the proximal interphalangeal joints and the metacarpophalangeal joints. A strain sensor for detecting movement of the first finger (thumb) may be provided in any other region that does not correspond to the metacarpophalangeal joints, or may be provided at any position where movement of the joint applies tension to the skin.

In relation to the data glove, each strain sensor is not particularly limited as long as being capable of detecting stretch of the glove body; and each strain sensor may have a shape such as, for example, a filamentous shape instead of a strip shape, or may be a sensor without any CNT film. Examples of the filamentous CNT strain sensor that may be used include a sensor in which elastic resin covers an outer periphery of a CNT fiber bundle composed of a plurality of CNT fibers arranged and oriented in one direction. A strain sensor other than CNT strain sensors is not particularly limited as long as being capable of detecting stretch and contraction of the glove body and being appropriately elastic and flexible, and is preferably formed in the shape of strip or string.

Instead of being attached onto the glove body, a strain sensor may be provided by applying a material constituting the strain sensor, for example, a coating material containing CNT, etc., to a cloth constituting the glove body.

The connection portion that bridges the stretch-restraining portions may connect other positions, without being limited to the proximal ends of the stretch-restraining portions. Alternatively, adjacent stretch-restraining portions may be connected by way of a plurality of connection portions.

INDUSTRIAL APPLICABILITY

The data glove according to the embodiments of the present invention can be preferably used for analyzing the hand motion of athletes or musical instrument players.

EXPLANATIONS FOR REFERENCE NUMERALS

1 Glove body
1a Slack 2, 3 Strain sensor
4 Flexible printed circuit board
4a Connector
5 Wiring
5a Distal connection portion
5b Proximal connection portion
5c Intermediate connection portion
5d Interconnection portion
5e Ground connection portion
6 Anti-separating member
7 Stretch-restraining portion
8 Connection portion
11, 12, 13 Strain sensor
14, 15 Wiring
14a Proximal connection portion
14b Intermediate connection portion
14c, 15b Interconnection portion
14d, 15a Distal connection portion

The invention claimed is:

1. A data glove, comprising:
a glove body; and
a plurality of strain sensors that detect stretch and contraction of the glove body, the strain sensors being each provided in a region corresponding to at least one finger of first to fifth fingers, on a dorsal side of the glove body, wherein
at least two of the strain sensors are provided to each of the at least one finger;
the plurality of strain sensors comprise a first strain sensor and a second strain sensor that detect stretch and contraction of the glove body in a proximal-distal direction, the first and second strain sensors being each provided in a region corresponding to a proximal interphalangeal joint and a region corresponding to a metacarpophalangeal joint, of at least one finger of the second to fifth fingers, on the dorsal side of the glove body; and
the date glove further comprises a plurality of stretch-restraining portions that restrain stretch of the glove body, the stretch-restraining portions being each provided in a region corresponding to an area between metacarpophalangeal joints along the proximal-distal direction, on the dorsal side of the glove body.

2. The data glove according to claim 1, wherein the plurality stretch-restraining portions extend in the proximal-distal direction on an inner surface side of the dorsal side of the glove body, where the inner surface of the dorsal side of the glove body denotes a surface side in contact with a hand of a wearer of the glove body when the glove body is worn.

3. The data glove according to claim 1, wherein
proximal ends of the stretch-restraining portions are located more proximally than the strain sensors, respectively; and
the data glove further comprises a connection portion that restrains stretch of the glove body, the connection portion being provided so as to bridge the plurality of stretch-restraining portions.

4. The data glove according to claim 1, wherein the stretch-restraining portions are provided to be superposed on wirings extending from the strain sensors, respectively.

5. A data glove, comprising:
a glove body; and
a plurality of strain sensors that detect stretch and contraction of the glove body, the strain sensors being each provided in a region corresponding to at least one finger of first to fifth fingers, on a dorsal side of the glove body, wherein
at least two of the strain sensors are provided to each of the at least one finger;
the plurality of strain sensors comprise a third strain sensor and a fourth strain sensor provided in each region corresponding to a metacarpophalangeal joint of at least one finger of the first to fifth fingers, on the dorsal side of the glove body; and
the third strain sensor is configured to detect stretch and contraction of the region in the proximal-distal direction; and the fourth strain sensor is configured to detect stretch and contraction of the region in a lateral direction.

6. The data glove according to claim 5, wherein the third strain sensor and the fourth strain sensor are provided so as to intersect each other.

7. The data glove according to claim 6, wherein an intersection angle formed by the third strain sensor and the fourth strain sensor is a substantially right angle.

8. The data glove according to claim 5, wherein the third strain sensor and the fourth strain sensor are provided in a region corresponding to the first finger.

9. A data glove, comprising:
a glove body;
a plurality of strain sensors that detect stretch and contraction of the glove body, the strain sensors being each provided in a region corresponding to at least one finger of first to fifth fingers, on a dorsal side of the glove body, wherein
at least two of the strain sensors are provided to each of the at least one finger; and
another strain sensor that detects stretch and contraction of the glove body in the proximal-distal direction, the another strain sensor being provided in a region along a proximal phalanx of the second or fifth finger, on a palm side of the glove body.

* * * * *